Aug. 6, 1946.　　　　H. P. CURLEE　　　　2,405,292
NUT BLANCHING MACHINE
Filed Jan. 24, 1944　　　　3 Sheets-Sheet 1
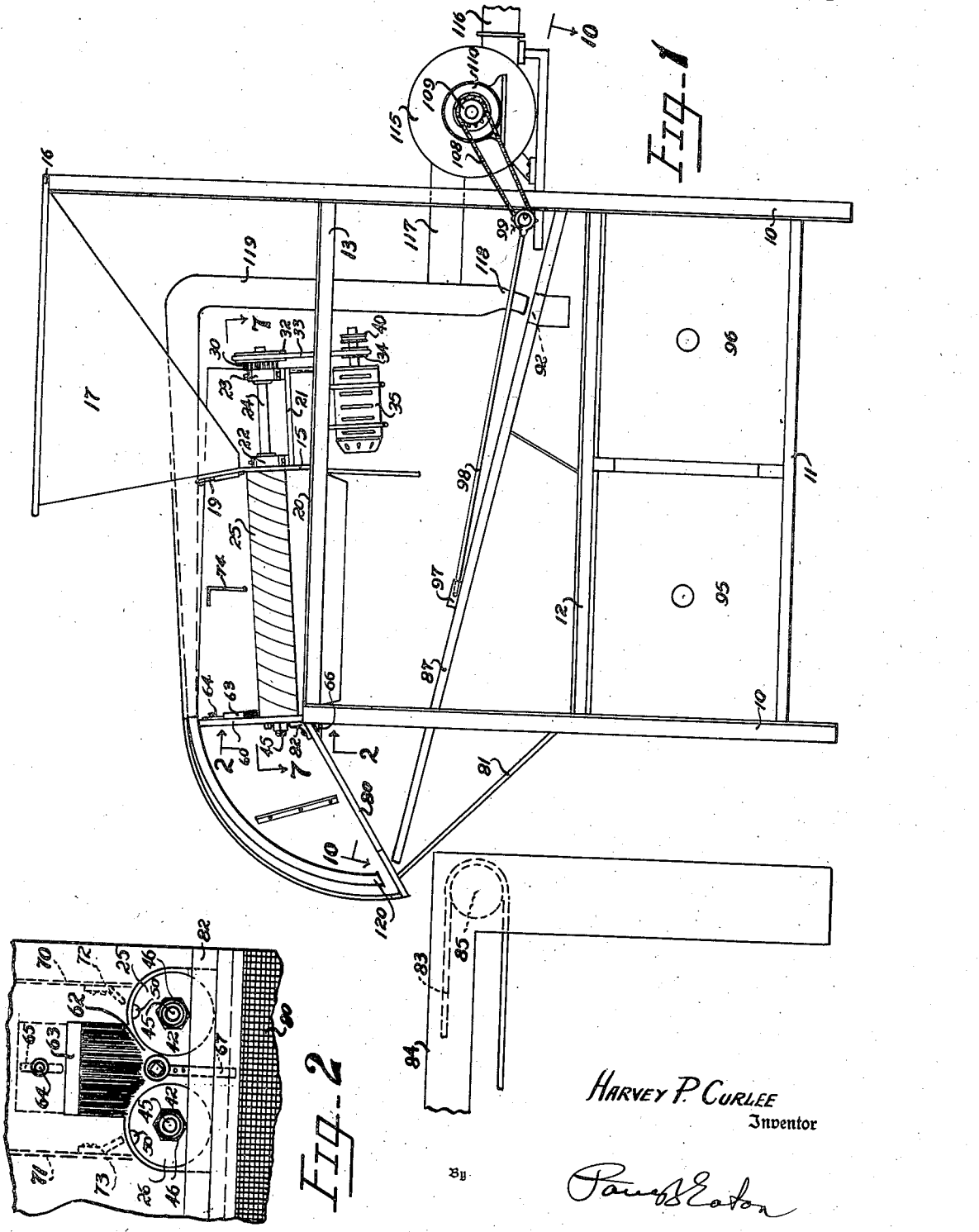
Harvey P. Curlee
Inventor
By
Attorney Aug. 6, 1946.　　　　H. P. CURLEE　　　　2,405,292
NUT BLANCHING MACHINE
Filed Jan. 24, 1944　　　　3 Sheets-Sheet 2
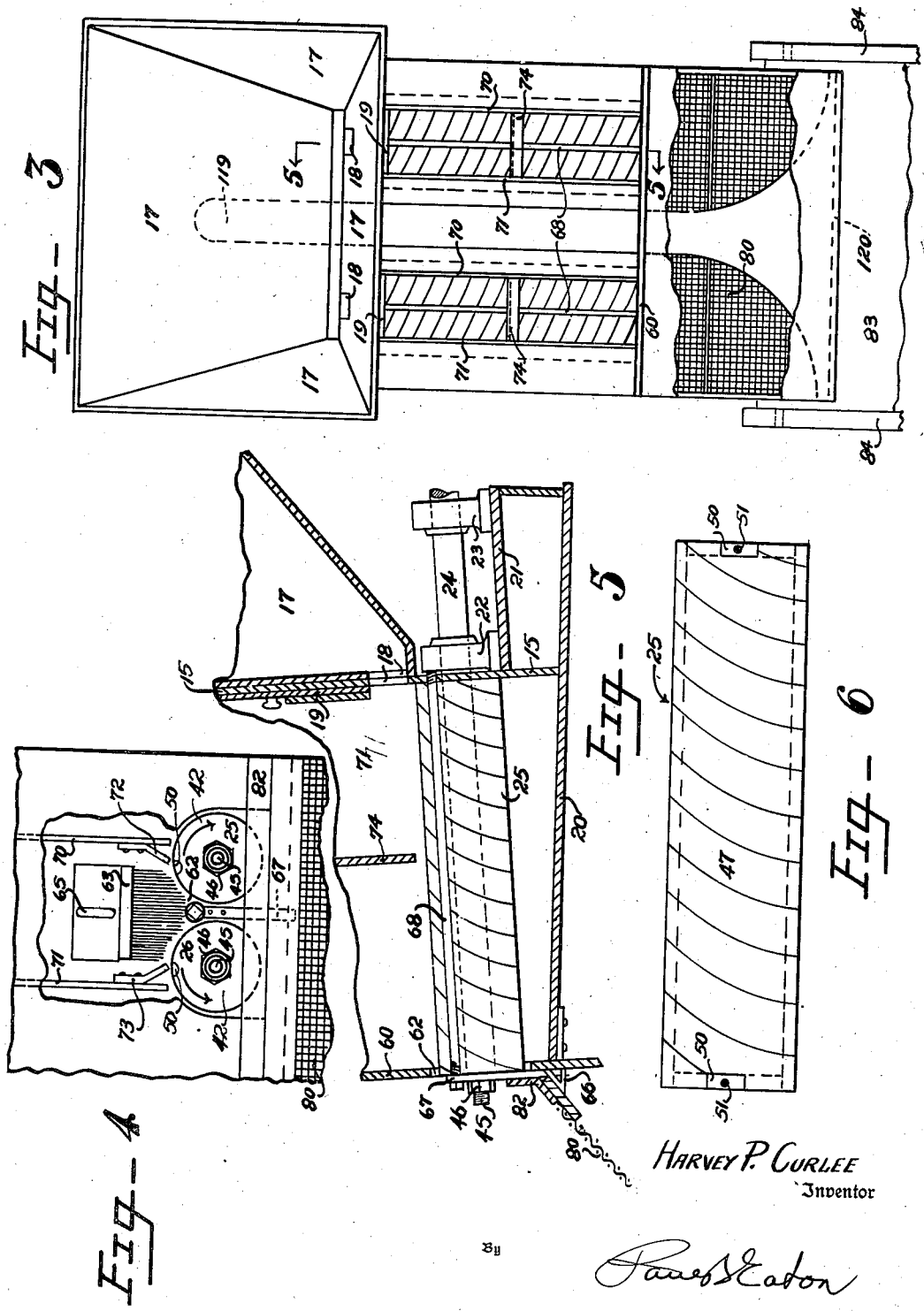
Harvey P. Curlee
Inventor
By Paul S. Eaton
Attorney

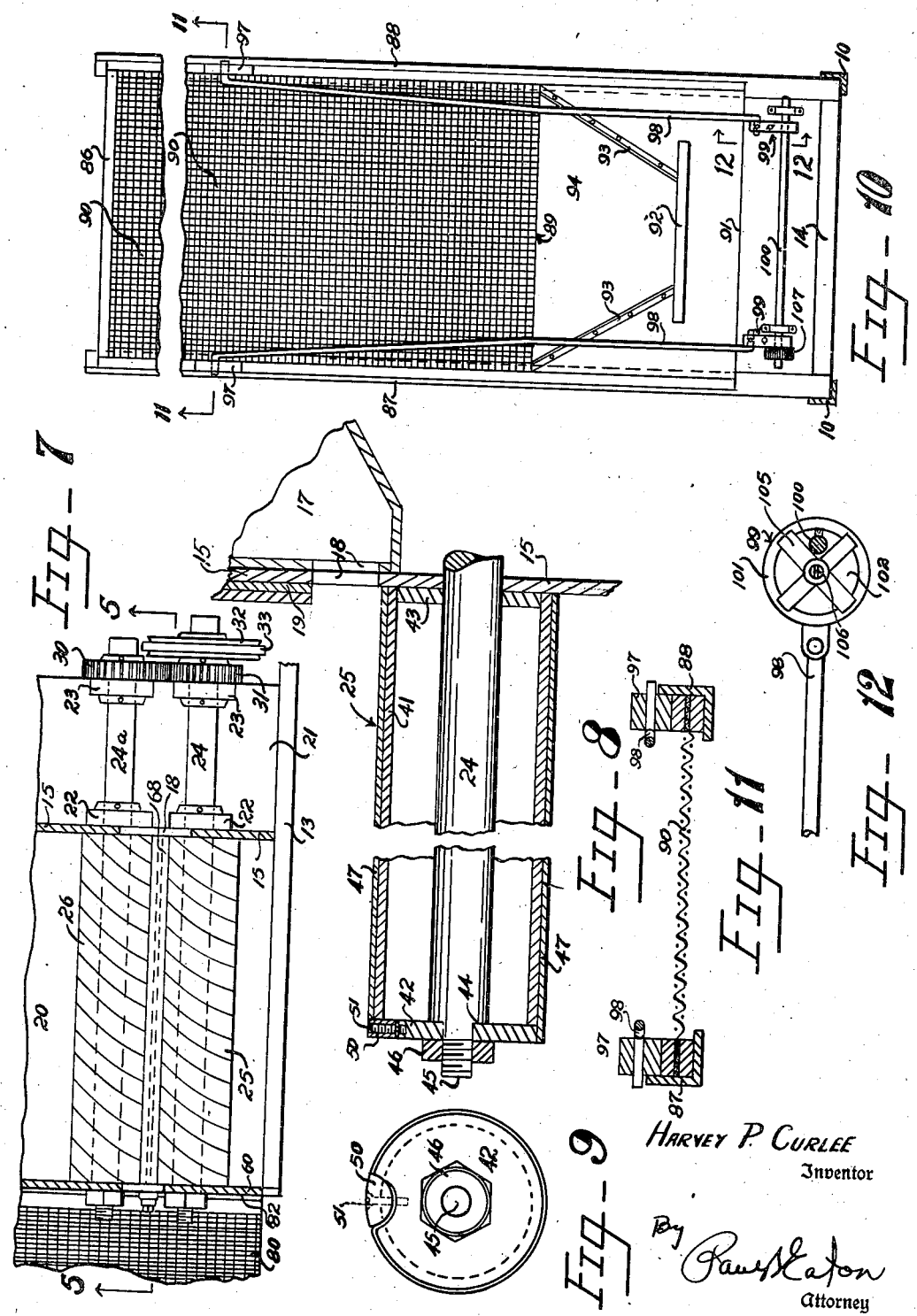

Patented Aug. 6, 1946

2,405,292

UNITED STATES PATENT OFFICE 2,405,292

NUT BLANCHING MACHINE

Harvey P. Curlee, near Charlotte, N. C.

Application January 24, 1944, Serial No. 519,574

6 Claims. (Cl. 146—32)

This invention relates to a peanut blancher, and more especially to a machine for blanching peanuts and other roasted or partially roasted nuts having quickly removable blanching cylinders and having means whereby the meal and hearts of the broken peanuts which are usually carried away as waste, are recovered and sold for commercial purposes. This machine is especially adapted for the blanching of peanuts which have a thin skin which must be removed before the nuts are subjected to other processing operations.

It is an object of this invention to provide a nut blancher in which the rolls are easily and quickly removable for the insertion of new rolls, as these rolls are covered with sandpaper or other abrasive covering and quickly wear out, and it is necessary in other machines of this type to largely dismantle the machine in order to place new blanching rolls in the machine, and by providing a quickly replaceable roll and also by providing means for retrieving the waste products of the machine, a double saving is effected.

It is another object of this invention to provide in a nut blancher means for separating the fine particles of nuts which are broken up in the blanching operation without the same being wasted by providing suction means for removing the chaff from the waste products and separating means for separating the fine meal from the coarser particles and depositing such into separate containers so that these products may be salvaged from the blanching operation.

Some of the objects of the invention having been stated, other objects will appear as the description proceeds, when taken in connection with the accompanying drawings, in which:

Figure 1 is a side elevation of the machine with the front side wall coverings removed from the frame-work of the machine;

Figure 2 is an end elevation of the blanching rollers and associated mechanism as viewed from along the line 2—2 in Figure 1;

Figure 3 is a top plan view of Figure 1, showing portions of the housing broken away;

Figure 4 is a view similar to Figure 2, but showing portions of the front wall broken away;

Figure 5 is a longitudinal sectional view taken along the line 5—5 in Figures 3 and 7, and omitting brush 63;

Figure 6 is an elevation of one of the blanching rolls disassociated from its driving shaft;

Figure 7 is a top plan view of one of the sets of blanching rolls, and showing the driving means in association therewith, and taken along the line 7—7 in Figure 1, and omitting the walls 70 and 71, gate 74, and also omitting the brush 63;

Figure 8 is a longitudinal sectional view in a vertical plane taken through one of the blanching rolls;

Figure 9 is an elevation looking at the left-hand of Figure 8;

Figure 10 is a top plan view of the screening mechanism, and taken substantially along the line 10—10 in Figure 1, omitting the suction nozzle and showing a portion broken away;

Figure 11 is a cross-sectional view taken along the line 11—11 in Figure 10;

Figure 12 is a view partly in section and partly in elevation, and taken along the line 12—12 in Figure 10.

Referring more specifically to the drawings, the numerals 10 indicate uprights of the framework, numerals 11, 12, and 13 represent the horizontal portions of the framework, the two sides of the frame being tied together by suitable angle irons such as indicated at 14. The end posts 10 extend up above the machine, and have suitable bars 16 secured thereto which support a hopper 17. The front wall of the hopper is supported by a plate 15. The plate 15 and the front wall of the hopper 17 have a pair of holes 18 therein through which the nuts may pass from the hopper to the blanching rolls. Each of these holes is regulated as to size by means of a sliding gate 19 for regulating the amount of nuts which may flow from the hopper 17 onto the blanching rolls. The horizontally disposed members 13 have mounted thereon a sheet member 20 which supports a platform 21 on which are mounted bearings 22 and 23 for the shafts 24 and 24a of the rolls 25 and 26. The shafts 24 and 24a have fixed thereon pinions 30 and 31 which mesh with each other, and shaft 24 has fixed thereon a V pulley 32 which has a belt 33 thereon, which belt is mounted on a pulley 34 of an electric motor 35 suitably suspended below the plate 21. These pinions 30 and 31 cause the top surfaces of the rollers to turn away from each other, the direction of rotation of roll 25 being clockwise and the direction of rotation of roll 26 being counter-clockwise in Figure 4. The rolls 25 and 26 are shown in pairs in the drawings, there being two pairs shown, but since they are identical, like references will apply to the two pairs of rolls and associated parts. Where duplicate sets of rolls are employed in the machine, the motor shaft of electric motor 35 would have an additional pulley 40 mounted thereon with a suitable belt running from pulley 40 to a pulley 32 mounted on one of the other pairs of shafts for driving the same where there are two pairs of shafts as shown in Figure 3. The rolls 25 and 26 are identical and comprise a cylindrical shell 41 having head members 42 and 43 in its ends, the head member 43 having a hole of sufficient size to slidably but snugly fit around the shaft 24 or 24a, and the shaft 24 or 24a at its free end is restricted as to size as at 45 which provides shoulders 44 against which a smaller hole in head member 42 is adapted to fit. The restricted portions 45 of the shafts 24 or 24a are threaded and have a nut 46 thereon so that when the blanching roller is placed on its shaft, it will be tightly held in concentric position relative to shafts 24 or 24a by tightening of the nut 46. When it is desired to remove the rolls 25 or 26 for replacing newly covered rolls, it is only necessary to remove the nut 46 and slide the rolls 25 or 26 from off shaft 24 or 24a. The rolls 25 and 26 are provided with a suitable abrasive covering such as sandpaper 47 which is spirally wound around the shell or cylinder 41, and the ends of this spirally wound portion of abrasive material 47 are secured in position by means of a suitable cap member 50 fitting in a cut-away portion in the shell and beneath which the end of the strip or sandpaper is adapted to fit and be bound in position. These cap members 50 are secured in the head members 42 and 43 by any suitable means such as a screw 51. The end of each blanching compartment remote from the hopper 17 has a wall 60 which is cut away to provide for removal of the rolls 25 and 26 from off the shafts 24 and 24a and is also cut away to provide an opening 62 through which the blanched nuts are adapted to pass after being blanched by the rolls 25 and 26. This opening 62 is partially closed by a brush 63 which is adjustably mounted on the inside portion of the wall 60 by any suitable means such as a bolt 64 mounted in wall 60 and penetrating a vertically disposed slot 65 in the top portion of the brush, so that by vertical adjustment of the brush, the amount of space between the ends of the rolls 25 and 26 and the brush can be adjusted to regulate the rate of flow of nuts from the blanching compartment. Immediately below the wall 60 is a transverse member 66 from which rises a support 67 for supporting one end of a rod 68, the other end of the rod being supported in the front wall of the hopper 17 which projects below the bottom of the hopper, and surrounding the shafts 24 and 24a. This rod is disposed in close proximity to the rolls 25 and 26, or close enough to prevent nuts from falling between the rods and the surfaces of the blanching rolls. Disposed between the hopper 17 and the end wall 60, and for each set of two of the rolls 25 and 26, there are disposed the vertical walls 70 and 71 and between which the nuts pass after passing through the openings 18 in the walls of the hopper 17. The side walls 70 and 71 have at their lower ends downwardly and inwardly projecting vanes 72 and 73 respectively which project into close proximity to the abrasive on the rollers 25 and 26, so that as the nuts are propelled against these vanes, they are pushed upwardly and fall backwardly towards a point above rod 68 which assists in the rolling or blanching operation. About midway between the walls of the hopper 17 and end walls 60, there are slidably disposed gate members 74 which can be vertically adjusted for regulating the amount of nuts which flow downwardly over the rolls 25 and 26. Disposed in a slanting position below the discharge end of the rolls 25 and 26 is a screen frame 80 whose upper end is adapted to rest on the ledge member 66 and whose lower end rests on the upwardly and outwardly slanting end portion 81, the upper end of the screen frame having secured thereto a flexible flap 82 made of suitable pliable material which is adapted to rest against the ends of the rolls 25 and 26 and against support 67 to prevent the nuts which fall off the ends of the rolls 25 and 26 from falling back underneath the rolls, but will cause them to fall downwardly over the screen 80 and be discharged onto an endless broad belt 83 disposed in an inspection table 84, and being mounted on rollers 85, the roller for the remote end of the belt not being shown in Figure 1. Operators sit or stand on each side of the table 84 and inspect the nuts on the belt to remove improperly blanched nuts or other imperfect nuts from the belt as the nuts move to discharge position at the other end of the belt.

Disposed below the plate 20 and the screen 80 is an elongated frame 86 which slidably rests on angle members 87 and 88. In the left-hand portion of the frame 86 as viewed in Figure 1 and out to point 89, a screen wire 90 is disposed within the frame 86 and from the point 89 onto the point 91, there is disposed a sheet metal member 94 having a slot 92 therein, and uprising vanes 93 are disposed on the sheet metal member 94 which guide the material which passes over the screen portion 90 into the slot 92. The fine meal and other fine particles resulting from broken nuts and the like in the blanching operation pass through screen portion 90 and strike against wall portion 81 and also fall directly downwardly into a drawer or bin 95; whereas, the coarser particles such as whole peanuts which might find their way onto the screen 90 or peanuts hearts or other coarser particles which will not pass through the screen 90 pass onto the sheet metal portion 94 and are guided by vanes 93 through the slot 92 and fall into a drawer or bin 96. The screen frame 86 is oscillated or vibrated very rapidly in order to assist in the sieving operation, and also so as to accentuate the travel of the chaff and coarser material downwardly over the screen and to shake the fine materials through the screen. This oscillation or shaking of the screen frame 86 is accomplished by means of the screen frame on each side having projections 97 through which a right angle portion of rods 98 project, and the other ends of these rods are mounted on eccentric members 99 secured on shaft 100. The eccentric members comprise a ring 101 to which the rods 98 are secured at their other ends, and this ring 101 is mounted on an eccentric cam 102 fixed on shaft 100. The rings 101 can be confined on the eccentric cams 102 by any suitable means such as spider members 105 being secured on each side of the eccentric cam 102 such as by a screw or bolt 106. The shaft 100 is driven by any suitable means such as by having fixed thereon a sprocket wheel 107 on which a sprocket chain 108 is mounted, said sprocket chain being also mounted on a sprocket wheel 109 fixed on the motor shaft of motor 110, which motor shaft also has mounted thereon a suitable centrifugal fan, not shown, which is disposed within centrifugal fan casing 115 which has an exhaust pipe 116 extending therefrom and an intake pipe 117 connected thereto, said intake pipe having a nozzle portion 118 extending downwardly into close proximity to slot 92 and broad enough to cover the slot 92 to lift all chaff and light material which may reach this point and expel it, so as to prevent its falling into the bin 96. The intake pipe 117 also has communicating therewith a suction pipe 119 which extends over to the front of the machine where its end is broadened to cover the width of screen 80 and has a nozzle 120 in close proximity to the lower end of the screen 80 to lift all chaff and other light material, such as hulls and the like from the screen 80 before such material has a chance to fall onto the conveyer belt 83 of the inspection table.

In the drawings and specification, there has been set forth a preferred embodiment of the invention, and although specific terms are employed, they are used in a generic and descriptive sense only and not for purposes of limitation, the scope of the invention being defined in the claims.

I claim:

1. In a nut blanching machine having a hopper for holding the nuts, a pair of rolls disposed below and to one side of the hopper and extending away from the hopper, means for imparting rotation to the rolls to cause their upper surfaces to move away from each other, means for feeding nuts from the hopper onto said rolls, said rolls being mounted so as to slope away from the point where the nuts are fed thereonto, a rod disposed between the rolls for preventing nuts from falling between the rolls, side wall members extending into close proximity to the uppermost portions of the rolls, downwardly and inwardly converging vane members forming a part of the lower portion of the side wall members for deflecting the nuts upwardly against the side walls as they are moved towards the side walls by the rolls, said rolls having an abrasive covering thereon, a screen onto which the nuts are adapted to fall after passing over the length of the rolls, brush means for regulating the rate of flow of the nuts from the rolls onto said screen, an inspection table disposed adjacent one end of said screen, and onto which the nuts are adapted to fall, the particles and pieces of nuts and some of the skin removed in the blanching operation being adapted to fall through said screen, a vibrating frame disposed below said screen and having a screen portion in one end thereof onto which the particles and skins and the like passing through the first screen are adapted to fall, means for imparting vibration to said screen frame, the finest particles being adapted to fall through the screen and the screen frame into a suitable receptacle, the lower end of the screen frame having a sheet metal portion onto which the particles and portions of nuts which do not pass through the screen and the screen frame are adapted to pass, a slot in said sheet metal portion through which said particles are adapted to fall, and to be received by a suitable second container disposed below the opening, and means for imparting vibration to the screen frame for assisting in the separation of the fine particles from the coarser particles and to move the coarser particles downwardly over the sheet metal portion and through said opening in the sheet metal portion.

2. In a nut blanching machine having a hopper for holding the nuts, a pair of rolls disposed below and to one side of the hopper and extending away from the hopper, means for imparting rotation to the rolls to cause their upper surfaces to move away from each other, means for feeding nuts from the hopper onto said rolls, said rolls being mounted so as to slope away from the point where the nuts are fed thereonto, a rod disposed between the rolls for preventing nuts from falling between the rolls, side wall members extending into close proximity to the uppermost portions of the rolls, downwardly and inwardly converging vane members forming a part of the lower portion of the side wall members for deflecting the nuts upwardly against the side walls as they are moved towards the side walls by the rolls, said rolls having an abrasive covering thereon, a screen onto which the nuts are adapted to fall after passing over the length of the rolls, brush means for regulating the rate of flow of the nuts from the rolls onto said screen, an inspection table disposed adjacent one end of said screen, and onto which the nuts are adapted to fall, the particles and pieces of nuts and some of the skin removed in the blanching operation being adapted to fall through said screen, a vibrating frame disposed below said screen and having a screen portion in one end thereof onto which the particles and skins and the like passing through the first screen are adapted to fall, means for imparting vibration to said screen frame, the finest particles being adapted to fall through the screen and the screen frame into a suitable receptacle, the lower end of the screen frame having a sheet metal portion onto which the particles and portions of nuts which do not pass through the screen and the screen frame are adapted to pass, a slot in said sheet metal portion through which said particles are adapted to fall, and to be received by a suitable second container disposed below the opening, and means for imparting vibration to the screen frame for assisting in the separation of the fine particles from the coarser particles and to move the coarser particles downwardly over the sheet metal portion and through said opening in the sheet metal portion, said rolls each having a shaft, and a cylindrical portion provided with head members adapted to fit over said shaft, and quick detachable means mounted on the shaft for holding the rolls on said shaft.

3. In a nut blanching machine having a hopper for holding the nuts, a pair of rolls disposed below and to one side of the hopper and extending away from the hopper, means for imparting rotation to the rolls to cause their upper surfaces to move away from each other, means for feeding nuts from the hopper onto said rolls, said rolls being mounted so as to slope away from the point where the nuts are fed thereonto, a rod disposed between the rolls for preventing nuts from falling between the rolls, side wall members extending into close proximity to the uppermost portions of the rolls, downwardly and inwardly converging vane members forming a part of the lower portion of the side wall members for deflecting the nuts upwardly against the side walls as they are moved towards the side walls by the rolls, said rolls having an abrasive covering thereon, a screen onto which the nuts are adapted to fall after passing over the length of the rolls, brush means for regulating the rate of flow of the nuts from the rolls onto said screen, an inspection table disposed adjacent one end of said screen, and onto which the nuts are adapted to fall, the particles and pieces of nuts and some of the skin removed in the blanching operation being adapted to fall through said screen, a vibrating frame disposed below said screen and having a screen portion in one end thereof onto which the particles and skins and the like passing through the first screen are adapted to fall, means for imparting vibration to said screen frame, the finest particles being adapted to fall through the screen and the screen frame into a suitable receptacle, the lower end of the screen frame having a sheet metal portion onto which the particles and portions of nuts which do not pass through the screen and the screen frame are adapted to pass, a slot in said sheet metal portion through which said particles are adapted to fall, and to be received by a suitable second container disposed below the opening, and means for imparting vibration to the screen frame for assisting in the separation of the fine particles from the coarser particles and to move the coarser particles downwardly over the sheet metal portion and through said opening in the sheet metal portion, a suction fan having nozzles, one disposed over the first-named screen and the other disposed over the opening in the sheet metal portion for withdrawing skins and other light weight particles away from said first-named screen and said opening as the lighter products of blanching coming from the rolls pass the nozzles.

4. In a nut blanching machine having a hopper for holding the nuts, a pair of rolls disposed below and to one side of the hopper and extending away from the hopper, means for imparting rotation to the rolls to cause their upper surfaces to move away from each other, means for feeding nuts from the hopper onto said rolls, said rolls being mounted so as to slope away from the point where the nuts are fed thereonto, a rod disposed between the rolls for preventing nuts from falling between the rolls, sidewall members extending into close proximity to the uppermost portions of the rolls, said rolls having an abrasive covering thereon, a screen onto which the nuts are adapted to fall after passing over the length of the rolls, means for regulating the rate of flow of the nuts from the rolls onto said screen, an inspection table disposed adjacent one end of said screen, and onto which the nuts are adapted to fall, the particles and pieces of nuts and some of the skin removed in the blanching operation being adapted to fall through said screen, a vibrating frame disposed below said screen and having a screen portion in one end thereof onto which the particles and skins and the like passing through the first screen are adapted to fall, means for imparting vibration to said screen frame, the finest particles being adapted to fall through the screen and the screen frame into a suitable receptacle, the lower end of the screen frame having an imperforate portion onto which the particles and portions of nuts which do not pass through the screen and the screen frame are adapted to pass, a slot in said imperforate portion through which said particles are adapted to fall, and to be received by a suitable second container disposed below the opening, and means for imparting vibration to the screen frame for assisting in the separation of the fine particles from the coarser particles and to move the coarser particles downwardly over the imperforate portion and through said opening in the imperforate portion.

5. In a nut blanching machine having a hopper for holding the nuts, a pair of rolls disposed below and to one side of the hopper and extending away from the hopper, means for imparting rotation to the rolls to cause their upper surfaces to move away from each other, means for feeding nuts from the hopper onto said rolls, said rolls being mounted so as to slope away from the point where the nuts are fed thereonto, a rod disposed between the rolls for preventing nuts from falling between the rolls, sidewall members extending into close proximity to the uppermost portions of the rolls, said rolls having an abrasive covering thereon, a screen onto which the nuts are adapted to fall after passing over the length of the rolls, means for regulating the rate of flow of the nuts from the rolls onto said screen, an inspection table disposed adjacent one end of said screen, and onto which the nuts are adapted to fall, the particles and pieces of nuts and some of the skin removed in the blanching operation being adapted to fall through said screen, a vibrating frame disposed below said screen and having a screen portion in one end thereof onto which the particles and skins and the like passing through the first screen are adapted to fall, means for imparting vibration to said screen frame, the finest particles being adapted to fall through the screen and the screen frame into a suitable receptacle, the lower end of the screen frame having an imperforate portion onto which the particles and portions of nuts which do not pass through the screen and the screen frame are adapted to pass, a slot in said imperforate portion through which said particles are adapted to fall, and to be received by a suitable second container disposed below the opening, and means for imparting vibration to the screen frame for assisting in the separation of the fine particles from the coarser particles, and to move the coarser particles downwardly over the imperforate portion and through said opening in the imperforate portion, said rolls each having a shaft, and a cylindrical portion provided with head members adapted to fit over said shaft, and quick detachable means mounted on the shaft for holding the rolls on said shaft.

6. In a nut blanching machine having a hopper for holding the nuts, a pair of rolls disposed below and to one side of the hopper and extending away from the hopper, means for imparting rotation to the rolls to cause their upper surfaces to move away from each other, means for feeding nuts from the hopper onto said rolls, said rolls being mounted so as to slope away from the point where the nuts are fed thereonto, a rod disposed between the rolls for preventing nuts from falling between the rolls, side wall members extending into close proximity to the uppermost portions of the rolls, said rolls having an abrasive covering thereon, a screen onto which the nuts are adapted to fall after passing over the length of the rolls, means for regulating the rate of flow of the nuts from the rolls onto said screen, an inspection table disposed adjacent one end of said screen, and onto which the nuts are adapted to fall, the particles and pieces of nuts and some of the skin removed in the blanching operation being adapted to fall through said screen, a vibrating frame disposed below said screen and having a screen portion in one end thereof onto which the particles and skins and the like passing through the first screen are adapted to fall, means for imparting vibration to said screen frame, the finest particles being adapted to fall through the screen and the screen frame into a suitable receptacle, the lower end of the screen frame having a sheet portion onto which the particles and portions of nuts which do not pass through the screen and the screen frame are adapted to pass, a slot in said sheet portion through which said particles are adapted to fall, and to be received by a suitable second container disposed below the opening, and means for imparting vibration to the screen frame for assisting in the separation of the fine particles from the coarser particles and to move the coarser particles downwardly over the sheet portion and through said opening in the sheet portion, a suction fan having nozzles, one disposed over the first-named screen and the other disposed over the opening in the sheet portion for withdrawing skins and other light weight particles away from said first-named screen and said opening as the lighter products of blanching coming from the rolls pass the nozzles.

HARVEY P. CURLEE.